United States Patent [19]

Bozza

[11] Patent Number: 4,928,809
[45] Date of Patent: May 29, 1990

[54] DEVICE FOR TRANSFERRING ARTICLES FROM A FIRST TO A SECOND CONVEYOR WITH PREDETERMINED ROTATION OF THE ARTICLES DURING THE SAID TRANSFER

[76] Inventor: Ireneo Bozza, Bologna, Italy

[21] Appl. No.: 608,458

[22] Filed: May 9, 1984

[30] Foreign Application Priority Data

Aug. 4, 1983 [IT] Italy ................... 3520 A/83

[51] Int. Cl.$^5$ ............................. B65G 47/24
[52] U.S. Cl. .................... 198/408; 198/412
[58] Field of Search ........... 198/408, 406, 412, 377, 198/474.1, 475.1, 463.4

[56] References Cited

U.S. PATENT DOCUMENTS

| 3,067,852 | 12/1962 | Barr | 198/381 |
| 3,300,022 | 1/1967 | Sterling | 198/380 |
| 3,330,403 | 7/1967 | Roberts et al. | 198/392 |
| 3,362,525 | 1/1968 | Fehr | 198/497 |
| 3,385,417 | 5/1968 | Dixon | 198/408 |
| 3,722,665 | 3/1973 | Probasco | 198/689.1 |
| 3,923,142 | 12/1975 | Rysti | 198/475.1 |
| 3,938,654 | 2/1976 | Mohr | 514/547 |
| 4,066,174 | 1/1978 | Collins et al. | 198/463.4 |
| 4,081,069 | 3/1978 | Ono | 198/381 |
| 4,093,062 | 6/1978 | Sjogren | 267/54 A |

FOREIGN PATENT DOCUMENTS

| 1209053 | 1/1966 | Fed. Rep. of Germany . |
| 2145599 | 5/1972 | Fed. Rep. of Germany ...... 198/408 |
| 2719327 | 11/1977 | Fed. Rep. of Germany . |
| 1028871 | 5/1953 | France ........................... 198/408 |
| 804449 | 2/1981 | U.S.S.R. ......................... 198/408 |
| 538980 | 8/1941 | United Kingdom . |
| 1352215 | 5/1974 | United Kingdom . |

Primary Examiner—Joseph E. Valenza

[57] ABSTRACT

The device comprises a disc interposed between a first station, supplied with articles by means of a first conveyor, and a second station, positioned downstream of the first station, in the region of the initial part of a second conveyor.

To one side of the said disc are articuled a plurality of transfer means angularly equidistant with respect to one another, each of which provided with a square shaped element that is turned towards the outside of the disc and the spatial orientation of which is entrusted to corresponding regulating means.

Each square shaped element withdraws, at the first station, the leading article in the row of articles present on the first conveyor, raises the said article with respect to the second article in the row, causes the said withdrawn article to rotate at a prior established angle during the transfer towards the second station, and then thrusts the said article in between the driven elements of the second conveyor without altering the orientation the said article adopted when in the second station.

5 Claims, 2 Drawing Sheets

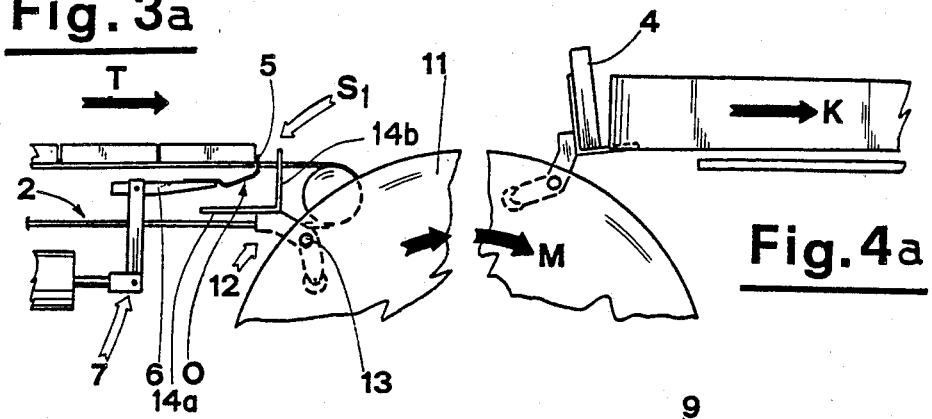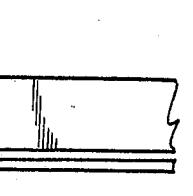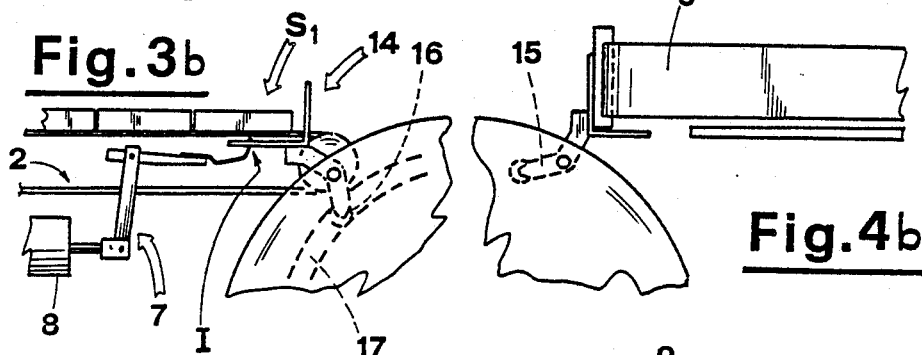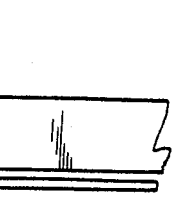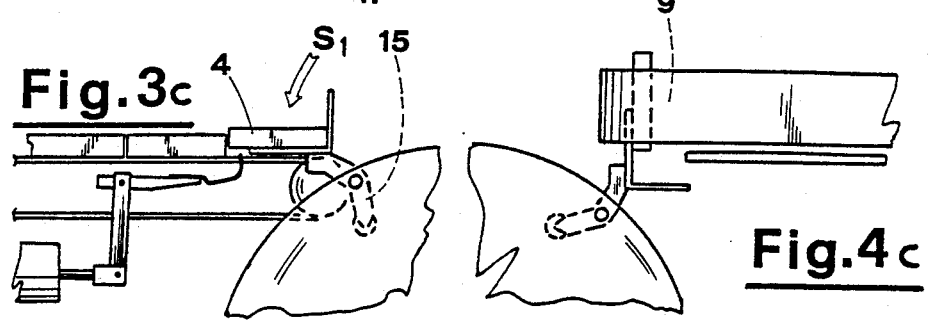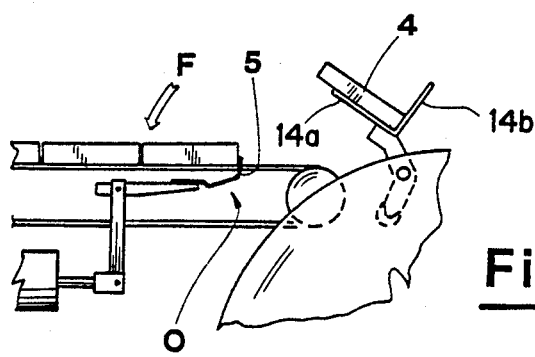

DEVICE FOR TRANSFERRING ARTICLES FROM A FIRST TO A SECOND CONVEYOR WITH PREDETERMINED ROTATION OF THE ARTICLES DURING THE SAID TRANSFER

BACKGROUND OF THE INVENTION

The invention relates to a device for transferring articles from a first to a second conveyor, with predetermined rotated of the articles during the said transfer.

DESCRIPTION OF THE PRIOR ART

The invention relates to a technological area concerned with the transfer of articles between two separate conveyors, namely a first and a second conveyor, achieved by giving each of the said articles a predetermined rotation (90° for example), with one being spaced a prior defined distance away from the other at the time the articles are accepted by the second conveyor.

Devices are already known that carry out the above mentioned operations.

In a first known device, the initial conveyor has, in proximity of the second, a curvature extending over a quarter of the circumference thereof, the purpose of this being to cause each article to rotate from the horizontal to the vertical position. Upon completion of the rotation, an intermittently operated pusher member transfers each article in between the pair of belts of the second conveyor, the belts being parallel one to other and also vertical.

With a device of this nature, the ends of the articles tends, during the rotation, to obstruct one another with the danger of there being bottlenects and consequent breaks in the infeed of the articles towards the station where the pusher member operates. Obvious are the problems experienced with the device as regards both the functional aspect and the operating speed thereof, the latter being limited by the speed of the pushed member.

In a second known device, interposed between the two conveyors there is a disc so positioned as to be in line with the conveyors, the axis of the disc being perpendicular to the transfer direction of the conveyors. The disc is provided peripherally with angularly equidistant housings designed to receive, resting on the surface thereof, the articles. Under the action of the first conveyor, each article is discharged from this into a corresponding housing in the disc. The rotation of the disc causes the rear end of the articles placed in the housing to knock against the front end of the articles following on in the row of articles present on the first conveyor. The contact is accentuated by the thrust action exerted by the conveyor on the articles in the row, and it can cause the leading article in the row to be pushed out of the row, or the ejection of the article just placed in the housing in the disc. The rotation of the disc causes a gradual rotation of each article resting in the corresponding housing in the disc. Once the article has undergone a 90° rotation, it arrives in the region of the initial part of the second conveyor constituted by the previously mentioned pair of belts. The action of inserting the articles in between these is consequential to the thrust that the furthermost edge of the housing exerts, due to the circular path described by the edge, on the rear vertical wall of the article.

Since the insertion is entrused to the thrust action of one edge on one wall, the predetermined spatial orientation of the articles in the grasp of the belts is not always achieved and, furthermore, it can cause the wall of the article subjected to the action of the edge to be scoren and/or to get torn.

In a variant to the method to which reference has just been made, the said thrust action is entrusted to a curved surface made in the disc downstream of each housing. However, the said variant only constitutes a palliative that does not solve the problems listed above.

SUMMARY OF THE INVENTION

The main object of the invention is to make available a device that carries out, at high operating speed, the transfer of articles from a first to a second conveyor and, at the same time, causes the articles to undergo, during the transfer, predetermined rotation in no way modified in consequence of the insertion of the articles in between the grasping and/or displacement means of the second conveyor, with everything being done without placing abnormal stress on the articles.

A further object of the invention is to achieve the foregoing result through a technical solution which, though original, is simple to construct and easy to maintain.

The objects are achieved with the device according to the invention for transferring articles from a first to a second conveyor, with predetermined rotation of the articles during the transfer, of the type connected to two separate stations, namely a first station and a second station, placed in line, the former supplied with the articles placed on the first conveyor, and the latter positioned downstream of the first station, in the region of the initial part of the second conveyor; the device being characterized by the fact of comprising: a disc interposed between the conveyors, carried in rotation in a prior established direction, and such as to be positioned, with the corresponding edge thereof, in the region or in proximity of both of the stations; a plurality of transfer means, the inner side of which pivotally articuled to one and the same side of the disc, the pivots being angularly equidistant with respect to one another, as well as equidistant from the axis of rotation of the disc, and the transfer means provided on the outer side with corresponding elements for receiving and/or grasping the articles; means for halting and unloosing the leading article in the row of articles present on the first conveyor, positioned upstream of the first station, these being set in and taken out of operation on a time relationship basis with the passing across the first station of the transfer means; and means for constantly regulating the spatial orientation of the transfer means, destined to allow for each of these, through the said corresponding receiving and/or grasping elements, the withdrawal of the leading article in the row of articles present in the first station, with the raising of the article with respect to the second article in the row, the rotation, at a prior established angle with respect to the vertical plane, of the article withdrawn, at the time the transfer means pass from the first to the second station and, in conclusion, the forced insertion of the article in between the driven elements of the second conveyor, with the spatial orientation of the article in question being maintained.

BRIEF DESCRIPTION OF THE DRAWINGS

The characteristic of the invention will become more apparent from the description that follows, with particular reference to the accompanying tables of drawings, in which:

FIGS. 3a, 3b, 3c and 3d show, laterally and diagrammatically in the opposite direction to that in the preceding figures, one aspect per figure relating to the withdrawal of an article at the first station;

FIGS. 4a 4b, and 4c show, laterally and diagrammatically, one aspect per figure relating to the insertion of an article in between the driven elements of a second conveyor.

DESCRIPTION OF THE PREFERRED EMBODIMENT

Figure 1:
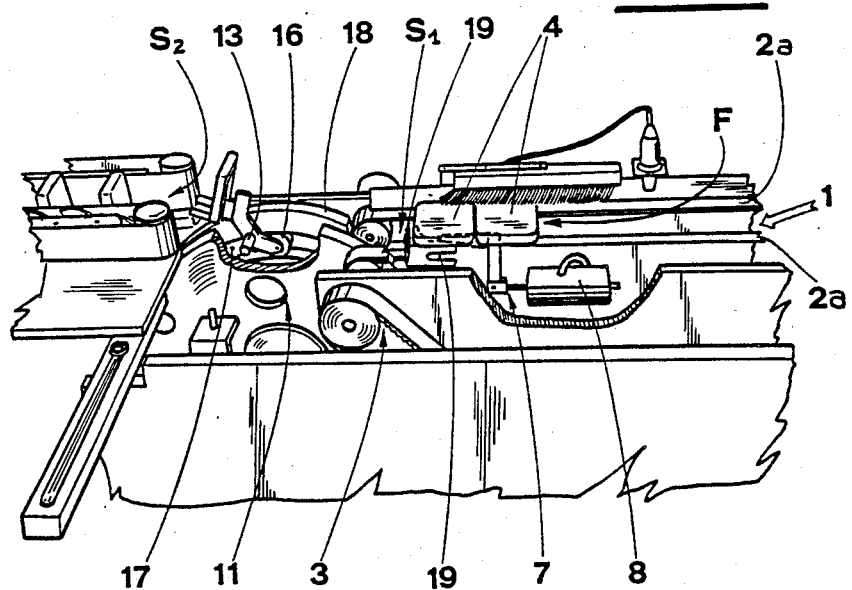
FIGS. 1 and 2 each show, in an almost lateral prospective view, the device according to the invention, with certain parts removed, at one characteristic moment in the operation thereof.

With reference to the said figures, shown at 1 is a first conveyor, constituted (in the case illustrated) by the top horizontal runs 2a of a pair of belts 2 driven in synchrony (direction T) through drive means 3, the crosswise distance one belt is away from the other being continuously adjustable (using known non-illustrated means) to suit the width of the articles 4 placed in a row F on the said top runs 2a.

The function of the conveyor 1 is to supply a first station $S_1$ with the said articles 4. The supply is dependent on the consent of a locator member 5 positioned between the said runs 2a, upstream of station $S_1$. The said locator member 5 is integral with a rod 6 subjected to the action of electromechanical devices 7 that include an electromagnet 8. With the said electromagnet de-energized, the locator member 5 projects way past the runs 2a(operating position 0) and the leading article 4 in the row F comes to a half against the locator member 5 (FIGS. 3a and 3d). When, instead, the electromagnet 8 is energized (FIGS. 3b and 3c), the locator member 5 remains below the runs 2a(non operative position I) and, in this case, the row F moves in the direction T and the leading article therein is transferred into the station $S_1$.

Downstream of the station $S_1$ is provided a second station $S_2$, in line with the former and positioned in the region of the initial part of second conveyor 10 whose transfer direction K is parallel to the direction T.

In the case described herein, the conveyor 10 is defined by the facing parallel, vertical, internal runs 9a of a pair of belts 9 mounted endlessly on corresponding vertical axis rollers (shown in part), the distance one run 9a is away from the other being continuously adjustable (in a known fashion) in such a way as to allow the said runs 9a to grasp the articles 4 forthcoming from the station $S_2$, inserted in between them in a way more about which will be said below.

Interposed between the conveyors 1 and 10 is a disc 11 in line with the directions T and K, the axis of which is perpendicular to the said directions. The disc, driven in the direction M, is so dimensioned that the edge 11a thereof passes in proximity of both of the aforementioned stations.

To one side of the said disc 11 are articulated a plurality of transfer means 12, the pivots 13 of which are angularly equidistant with respect to one another, as well as equidistant with respect to the axis of rotation of the disc. The outer side of each of the means 12 is provided with a receiving element 14 (in the form of a square) that has an outer limb 14a and an inner limb 14b outside the pheriphery of the disc (at least in the working area depicted in FIGS. 3 and 4)., while the inner side is provided with an arm 15 that loosely carries a rollers 16. The roller 16 is obliged to slide inside a groove 17 made in a fixed plate 18 (parallel to the disc 11) and extending along a line that delimits a particular predetermined profile such as to occasion, in consequence of the engagement of this with the roller 16 and in combination with the rotation of the disc 11 in the direction M, the continuous regulation of the spatial orientation of the receiving element 14 through, for example, the outer limb 14a thereof, in the way outlined below.

The said limb 14a adopts a horizontal position immediately prior to, during, and immediately after having passed through the station $S_1$(FIGS. 3a, 3b and 3c), rotates at a prior established angle in the direction M (90° in the case described herein) when passing from the station $S_1$(FIG. 3d) to the station $S_2$(FIG. 4b), and then adopts a vertical position immediately prior to, during, and immediately after having passed through the station $S_2$(FIGS. 4b and 4c).

It is emphasized that the limbs 14a and 14b of the element 14 have in them, commencing at the front edge, a slit 19 whose purpose is to prevent the said limbs from hitting against the locator member 5 and the rod 6.

How the device according to the invention operates can readily be understood from the explanation given above.

Figure 2:
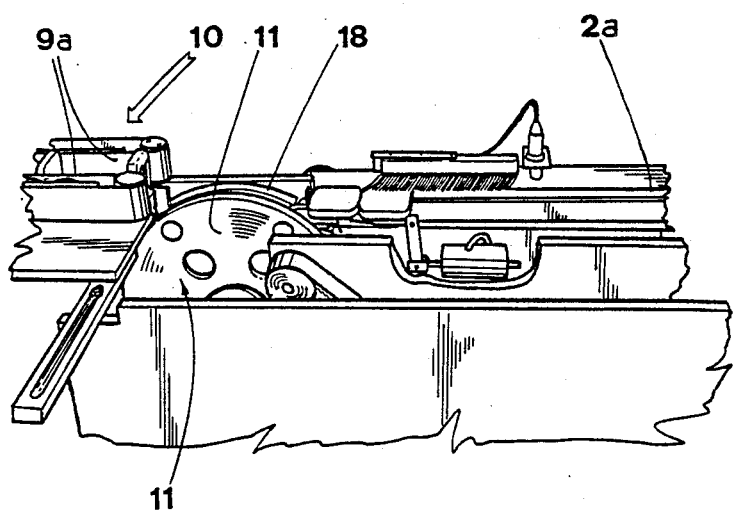

Assuming the configuration to be that shown in FIG. 3a, that is to say with the transfer means 12 immediately downstream of the station $S_1$ and, therefore, with the limb 14a of the element 14 positioned horizontally and the leading article in the row F flush up against the locator member 5 (operating position 0 of the latter), at this point appropriate sensors (not illustrated) cause the eletromagnet 8 to be energized on a time relationship basis with the passing of an element 14 through the station $S_1$. The locator means 5 pass into the non-operative position I (FIG. 3b) whereby the row F is allowed to move in the direction T (FIGS. 1 and 3b) under the carrying action of the top runs 2a. The transfer of the article 4 on to the square shaped element 14 takes place without any impact on account of the fact that the leading article, during the movement in the direction T, is placed gently resting on the limb and that, at the time the said article is being rested, the velocity component of the element 14, in the direction T, is partically identical (or even completely identical) to the velocity of the said leading article. This last mentioned point is particularly advantageous since when the leading article is being raised (by the limb 14a still in the horizontal position), the back of the said article skims over the front of the second articles in the row (FIGS. 2 and 3d) without causing any longitudinal stress to be created between the articles in the row since the movement in the direction T of one and the other takes place at identical speed.

As regards the locator member 5, just as soon as the leading article has been raised above the top runs 2a, this returns to configuration 0 so as to halt the article now at the head of the row. When passing from station $S_1$ to station $S_2$, the limb undergoes, as will be recalled, a 90° rotation in the direction M.

The entroy of the element 14 into the station $S_2$ occurs with the article 4 perfectly vertical (FIG. 4b).

The said article is thrust in between the opposite runs 9a of the conveyor 10 through the medium of the limb 14a which, at this thrust stage, is maintained vertical and thus the insertion of the article in between the said runs take place with vertically of this being maintained.

To recapitulate, the device forming the subject of the invention intermittently withdraws the articles from the station $S_1$ without the withdrawal causing abnormal longitudinal stress between the articles in the row. transfers the said articles from station $S_1$ to station $S_2$ rotating them at a prior established angle, and then inserts the articles in guestion in between the driven elements of the conveyor 10 without altering the orientation the said articles adopted when in the station $S_2$.

Thus the object of the invention are indeed achieved.

It is understood that the foregoing description has been given purely an unlimited example and, therefore, that eventual variants of a practical-constructional nature to the technical solution as defined above (for example, the substitution of the receiving element 14 with grasping means of, for example, the suction type, and the remplacement of the said means for regulating the spatial orientation of the transfer means 12 with electric, electromechanical or electronic means that carry out the same functions) do not adversely affect the framework of protection affored to the invention as described above and claimed herein after.

What is claimed is

1. Device for transferring articles from a first to a second conveyor through first and second stations, with predetermined rotation of the articles during the said transfer, comprising: a first and second conveyor, a rotatable disc interposed between said conveyors; a plurality of transfer means, each pivotally articulated to said disc, said pivots being angularly equidistant with respect to one another, as well as equidistant from the axis of rotation of said disc, each transfer means defining inner and outer arms, said outer arm having fixed thereto a right angular receiving element for receiver and/or grasping said articles; means for halting and unloosening the leading article in the row of articles present on the first conveyor, positioned upstream of the said first station, said means being operated on a time relationship basis with the passing through the first station of said transfer means; and means for constantly regulating the spatial orientation of said transfer means, so that the article in moving from the first conveyor to the second conveyor will pass through an arc of 90°.

2. The device according to claim 1, wherein each said receiving element defines two limbs at right angle to each other, one limb of which is, under the action of said means for constantly regulating the spatial orientation, parallel to a resting plane of said row of articles, and turned towards said plane immediately prior to, during and immediately after the passing of said limb across said first station, in order to receive resting thereon the leading article and then to raise the said article with respect to the second article in the said row, said limb subsequently adopting a position perpendicular to the movement direction of said second conveyor immediately prior to, during, and immediately after the passing of said limb across said second station, in order to thrust the said article in between driven elements of said second conveyor.

3. The device according to claim 1, including a guide roller rotatably mounted on said inner arm of said transfer means and a fixed plate parallel to said disc defining a groove therein facing said disc, said groove extending along a line that delimits a predeterminted profile, said guide roller riding in said grove.

4. The device according to claim 3, wherein each said receiving element defines two limbs, both said limbs of each said receiving element have a slit, commencing at a free edge, to accept therebetween a locator member of said means for halting and unloading, prior to passing said receiving element across said first station.

5. The device according to claim 1 further comprising an electrical mechanical device, and wherein said first conveyor is constituted by top runs of two side by side belts, said means for halting and unloosening the leading article in a row are constituted by a rod positioned below said top runs and in the space existing therebetween, said rod having an extremity which is turned towards said first station and is provided with an upward pointing locator member, said rod having connected to said electromechanical device and defines for said locator member, an extreme position, in which the leading article in the row of articles present on the first conveyor is intercepted, and an extreme position in which the leading article is not intercepted and wherein each said receiving element defines two limbs, both said limbs of each said receiving element have a slit, commencing at a free edge, to accept therebetween a locator member of said means for halting and unloosening, prior to passing said receiving element across said first station.

* * * * *